(12) United States Patent
Brooker

(10) Patent No.: US 6,813,476 B1
(45) Date of Patent: Nov. 2, 2004

(54) METHOD AND SYSTEM FOR COMPENSATING FOR ATMOSPHERIC FADING IN A COMMUNICATIONS SYSTEM

(75) Inventor: Ralph L. Brooker, Alexandria, VA (US)

(73) Assignee: Andrew Corporation, Orland Park, IL (US)

( * ) Notice: Subject to any disclaimer, the term of this patent is extended or adjusted under 35 U.S.C. 154(b) by 745 days.

(21) Appl. No.: 09/711,559

(22) Filed: Nov. 13, 2000

(51) Int. Cl.[7] ............................................. H04B 17/02
(52) U.S. Cl. ....................... 455/10; 455/13.1; 455/430
(58) Field of Search ............................. 455/12.1, 13.1, 455/13.2, 9, 427, 10, 428, 429, 430, 431, 63.1, 67.1, 226.1; 342/358, 357, 356

(56) References Cited

U.S. PATENT DOCUMENTS

| | | | | |
|---|---|---|---|---|
| 4,261,054 A | * | 4/1981 | Scharla-Nielsen | 455/13.4 |
| 4,301,533 A | | 11/1981 | Acampora et al. | 370/104 |
| 4,309,764 A | | 1/1982 | Acampora | 370/83 |
| 4,567,485 A | * | 1/1986 | Oshima et al. | 342/358 |
| 4,731,866 A | | 3/1988 | Muratani et al. | 455/9 |
| 4,752,967 A | * | 6/1988 | Bustamante et al. | 455/13.4 |
| 4,776,035 A | | 10/1988 | Duggan | 455/69 |
| 4,896,369 A | * | 1/1990 | Adams et al. | 455/13.4 |
| 4,910,792 A | * | 3/1990 | Takahata et al. | 455/10 |
| 4,941,199 A | * | 7/1990 | Saam | 455/10 |
| 5,060,292 A | | 10/1991 | Ayukawa et al. | 455/52 |
| 5,081,713 A | | 1/1992 | Miyazaki | 455/76 |
| 5,204,970 A | | 4/1993 | Stengel et al. | 455/69 |
| 5,257,029 A | * | 10/1993 | Miyo | 342/352 |
| 5,455,823 A | | 10/1995 | Noreen et al. | 370/50 |
| 5,574,982 A | | 11/1996 | Almgren et al. | 455/69 |
| 5,574,984 A | | 11/1996 | Reed et al. | 455/69 |
| 5,619,525 A | * | 4/1997 | Wiedeman et al. | 375/130 |
| 5,708,966 A | | 1/1998 | Al-Dhahir et al. | 455/13.4 |
| 5,828,335 A | | 10/1998 | Al-Dhahir et al. | 342/352 |
| 5,867,769 A | | 2/1999 | Ichiyanagi | 455/69 |
| 5,878,329 A | * | 3/1999 | Mallinckrodt | 455/69 |
| 5,956,619 A | * | 9/1999 | Gallagher et al. | 455/12.1 |
| 6,085,067 A | * | 7/2000 | Gallagher et al. | 455/13.1 |
| 6,308,080 B1 | * | 10/2001 | Burt et al. | 455/522 |
| 6,587,687 B1 | * | 7/2003 | Wiedeman | 455/428 |

OTHER PUBLICATIONS

Pascall Electronics Ltd., www.pascall.co.uk.
UPC–100 Uplink Power Controller System, L3 Communications, LNR/STS, www.lnrtrexcom.com.
RCP–1000, Vertex RCI, www.rsicom.com.
PS–1000, Vertex RCI, www.rsicom.com.
SDM–300A, Comtech EF Data, www.comtechefdata.com.
Crystal Vision 2000 Monitor and Control System, Crystal Computer Corporation, www.crystalcc.com.
Uplink Power Control, Crystal Computer Corporation, www.crystalcc.com.
"Rain Fade Compensation Alternatives for Ka Band Communication Satellites," Roberto J. Acosta, Ph.D., NASA Lewis Research Center, 3rd Ka Band Utilization Conference, Sep. 15–18, 1997, 21 pages.
Utlization of Fade Countermeasures Strategies and Techniques in the Fixed–Satellite Service, Recommendation ITU–R S.1061 (Question ITU–R 47/4), 1994, 21 pages.

* cited by examiner

Primary Examiner—Tilahun Gesesse
(74) Attorney, Agent, or Firm—Jenkens & Gilchrist

(57) ABSTRACT

A method and system for compensating for atmospheric fading is used in a communication system wherein communication signals are exchanged between first and second earth stations via a satellite link, without increasing power of the satellite link. The method includes determining, at one or both of the earth stations, the signal power of a received signal and a signal-to-noise ratio of the received signal; calculating the difference in noise power spectral density in the received signal from that under clear sky conditions; calculating the downlink attenuation; determining the uplink attenuation, and commanding the transmitting earth station to increase its transmit power by an amount to compensate for the uplink attenuation. A corresponding system carries out the method.

34 Claims, 3 Drawing Sheets

METHOD AND SYSTEM FOR COMPENSATING FOR ATMOSPHERIC FADING IN A COMMUNICATIONS SYSTEM

FIELD OF THE INVENTION

The present invention relates to satellite communications and to earth stations (terminals) for geostationary satellites using "bent pipe" (analog repeater) transponders. More particularly, the invention relates to small networks (as few as two stations, i.e., a point-to-point link) for satellite communications.

BACKGROUND OF THE INVENTION

Communications links are commonly implemented with repeaters on above-atmosphere platforms such as satellites. In a typical satellite link, (refer to FIG. 1) forward signals (11) transmitted from earth station A (10) pass through the earth's atmosphere, are linearly amplified by a constant amount by a transponder in the satellite 15, and transmitted down through another part of the atmosphere to earth station B (12). Earth stations may be equipped to transmit, receive, or both. A reverse signal (13) may be similarly transmitted from earth station B to earth station A. Occasional atmospheric disturbances such as rain may attenuate the signal on the uplink path (i.e., from an earth station up to the satellite), the downlink path (i.e., from the satellite down to an earth station), or both. These events are called "fades" or "rain fades" and are symbolized at reference numerals 14 and 16.

Referring to FIG. 2, an earth station equipped for receiving fundamentally is comprised of an antenna 18, a low-noise amplifier/converter function 20, and a demodulator function 22. The demodulator's primary function ("demodulation") is to convert the received modulated signals to data output 24. If the earth station also has transmitting capability, the demodulator function might be included in a modem, and the low-noise amplifier/converter function might be included in a transceiver.

The quality of the received signal is defined by the signal-to-noise ratio. In a digital communications link, signal-to-noise ratio may be normalized to the data rate and unit noise bandwidth, and is then referred to by the quantity $E_b/N_o$, where $E_b$ is a signal energy per data bit and $N_o$ is a noise power spectral density.

Because fades affect both the signal strength and the total noise at the receiving earth station, variations in the uplink and downlink fade attenuations ($A_u$ and $+A_d$, respectively) cause variations in $E_b/N_o$. In particular, if the power of the signal at the transmitting station is held constant, during uplink or downlink fades, the $E_b/N_o$ at the receiving station will degrade.

This degradation might then be compensated for by increasing the power of the signal at the transmitting earth station during a fade event. However, it is often an overriding requirement that the power of each signal at the satellite transponder output must not exceed a maximum value authorized by the satellite operator. Commonly this maximum value is approximately equal to the nominal operating power.

Therefore, the fading on the uplink path may be compensated by increasing transmit power, but fading on the downlink path should not be compensated by increasing transmit power. This imposes a requirement on the compensation algorithm that it must use some means to independently assess the uplink and downlink fade conditions or otherwise maintain constant power at the transponder output.

This is traditionally done in several ways:

a. The uplink earth station is equipped with an additional receiver which measures a constant-power beacon signal provided on the satellite. Measurement of this beacon signal strength is a direct indication of uplink fade, after calibration for frequency difference, due to the known frequency response of the fade medium, b. The uplink earth station is equipped with an additional receiver which measures the strength and/or signal quality of its own uplinked signal, c. Each earth station in a geographically-dispersed network reports the received signal quality and/or strength to the uplink earth station (directly, or indirectly via a management earth station). Under the assumption that fading is likely to happen at only a small proportion of the stations, the identity of the station experiencing an uplink fade can be deduced and the uplink and downlink fade independently quantified; and d. Combinations of the above.

Methods a and b require additional equipment beyond what is necessary to implement the communications link. Method c is not viable in a network of two stations, or if fade occurs simultaneously at a significant proportion of the population of stations in the network.

OBJECTS OF THE INVENTION

As indicated above, in order for an earth station to compensate for atmospheric fading by adjusting transmit power while preventing accidental overload of the satellite transponder, it is necessary to separately derive the uplink and downlink fade attenuation values. The invention is directed to a method of deriving and using this information using the same signals and equipment commonly used to implement the communications link.

SUMMARY OF THE INVENTION

In accordance with one aspect of the invention, a method is provided for compensating for atmospheric fading in a communication system wherein communication signals are exchanged between first and second earth stations via a satellite link, without increasing power of the satellite link. The method comprises determining at one or both of the earth stations, the signal power of a received signal and a signal-to-noise ratio of the received signal, calculating the difference in noise power spectral density in the received signal from the noise power spectral density under clear sky conditions, calculating the downlink attenuation; determining the uplink attenuation present at a transmitting one of the earth stations and commanding the transmitting one of the earth stations to increase its transmit power by an amount to compensate for the uplink attenuation.

In accordance with another aspect of the invention, there is provided a system for carrying out the foregoing method.

DEFINITION OF TERMS $A_u$=uplink fade attenuation (change from clear-sky)
$A_d$=downlink fade attenuation (change from clear-sky)
S=signal strength in dB at the receiving earth station
S'=S under clear-sky conditions
$\Delta S.$=change in S from clear-sky conditions=S−S'
$E_b/N_o$=Signal-to-noise ratio, with signal normalized to the data rate, and noise bandwidth normalized to 1 Hz.
$Q=E_b/N_o$, or any equivalent measure of signal-to-noise ratio
Q'=Q under clear-sky conditions
$\Delta Q^{dB}$=change in Q from clear-sky conditions=$Q^{dB}-Q'^{dB}$
$N_o^{dB}$=power spectral density, in dB, of the noise at the receiving earth station=$S^{dB}-Q^{dB}+K$
K=Calibration constant
$N_o'=N_o$ under clear-sky conditions
$\Delta N_o$=change in $N_o$ from clear-sky conditions=$N_o^{dB}-N_o'^{dB}$
G/T=receive gain of the antenna in dBi minus 10 log of the noise temperature of the antenna and receiver in Kelvin, in units of dB/K. G/T is a figure of merit for the sensitivity of an antenna with receiver.

Note: Throughout, dB superscript indicates value in decibels; without superscript, the value is in power or power ratio.

DETAILED DESCRIPTION OF THE INVENTION

Figure 1:
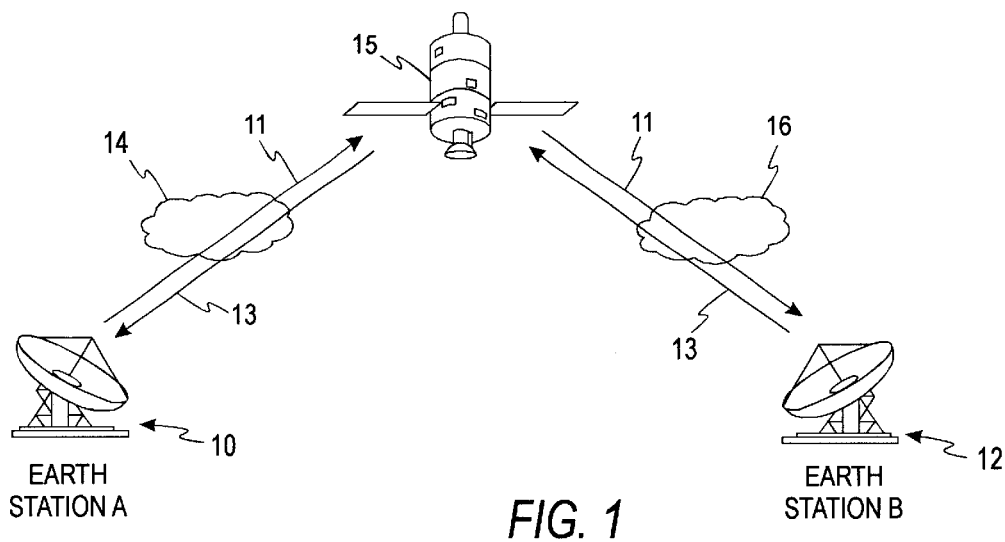
FIG. 1 is a simplified diagram showing a pair of earth stations communicating via a satellite.
Figure 2:
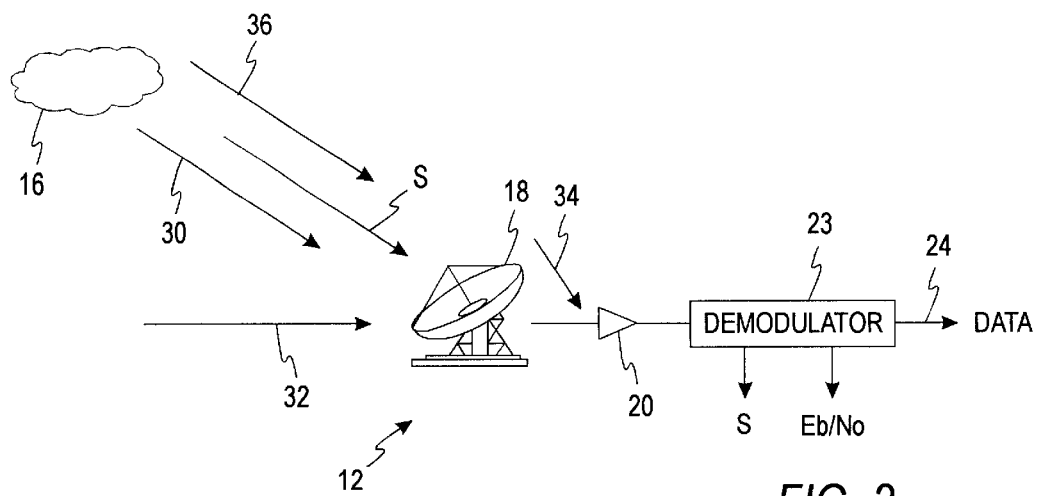
FIG. 2 is a simplified diagram showing an earth station receiving and measuring a downlink signal from a satellite and various sources of noise.

Referring to FIG. 2, an Earth Station may be equipped with the capability to independently measure signal strength S, in addition to $E_b/N_o$ or some other equivalent measure of signal-to-noise ration. For convenience, $E_b/N_o$, which represents signal quality, is designated hereafter as Q, and the invention applies to any equivalent definition in which Q is proportional to signal-to-noise ratio. This measurement of S and Q might be made with separate devices or by use of inherent capabilities of a modem or demodulator 23. The invention uses both S and Q to separately deduce $A_u$ and $A_d$, as more fully described below.

To simplify the analysis, the quantity $N_o$ is used. $N_o$ represents the noise spectral density at the receiver, and is proportional to the ratio S/Q (or the difference between $S^{dB}$ and $Q^{dB}$).

Figure 4:
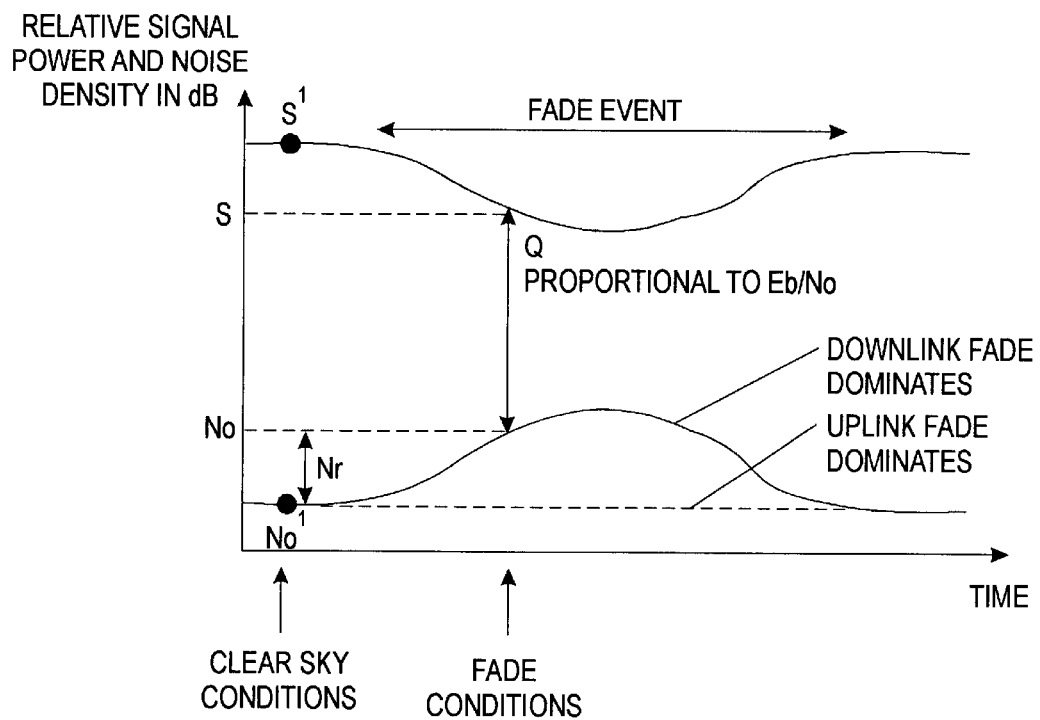
FIG. 4 is a simplified plot illustrating the signal to noise conditions under clear sky conditions and various fade conditions.

In this regard, FIG. 4, which is further described below, illustrates the typical time-varying behavior of the quantities S and $N_o$, where $N_o$ is simply derived from S, Q and a calibration constant K. Under clear-sky conditions, and assuming no time-varying parameters which may affect S or $N_o$ (such as varying transponder noise 36, receiver noise 34, or terrestrial interference noise 32), S and $N_o$ remain constant at their nominal values, denoted S' and $N_o'$ respectively. Changes in $S^{dB}$ and $Q^{dB}$ from clear-sky conditions are denoted $\Delta S^{dB}$ and $\Delta N^{dB}$, respectively.

Atmospheric fading is caused by attenuation in a warm (i.e., above absolute zero temperature) physical medium (such as water droplets or vapor). Therefore, the medium not only attenuates signals but creates thermal noise 30. Because the satellite's receiving antenna, being pointed at the earth, sees the background temperature of the earth's surface, which is approximately the same temperature as the medium which created the fade noise, uplink fade $A_u$ has an insignificant effect on the total noise spectral density at the receiver (earth station 12). The antenna 18 of the receiving earth station 12, by contrast, sees mainly the very low temperature of deep space. Downlink fade $A_d$ therefore may cause a significant increase in total noise spectral density at the receiver 12 (provided that other noise sources in the link are small). FIG. 4 illustrates typical changes in $N_o$ due to uplink fade as compared to downlink fade.

By continually measuring $S^{dB}$ and $Q^{dB}$, and subtracting $Q^{dB}$, the change in noise spectral density $N_o^{dB}$ at the receiver 12 may be estimated.

Figure 3:
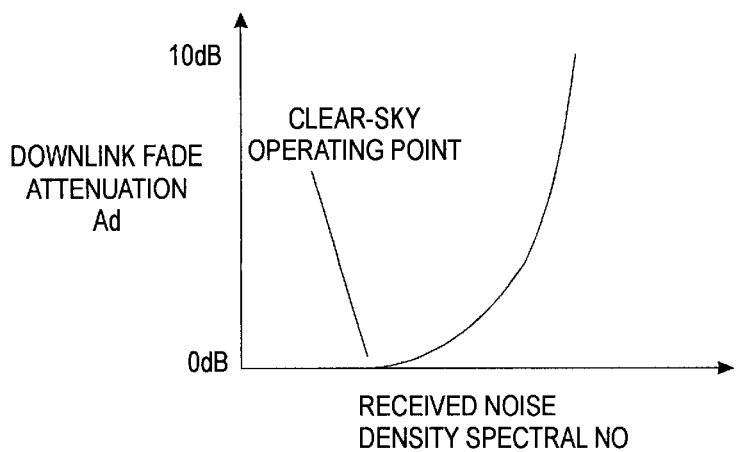
FIG. 3 is a simplified plot showing the general form of the relationship between noise power spectral density and downlink fade attenuation.

The relationship between $N_o$ and $A_d$ is a monotonic function of the general form represented by a curve shown in FIG. 3. The parameters describing the shape of the curve and its intercept point with the X-axis depend upon the initial clear-sky conditions S' and Q', and also parameters of the link, such as physical temperature of the fade attenuation medium, the antenna noise temperature 32, the receiver (e.g., amplifier) noise FIG. 34, transponder-generated noise 36, receiver gain. Calibration techniques described below may be used to allow the curve parameters to be determined for the operating parameters of a particular earth station and satellite.

Once the curve parameters are known, the downlink fade $A_d$ may be estimated from $\Delta N_o$. Because under clear-sky conditions $A_u^{dB}=0$ and $A_d^{dB}=0$, the change in received signal strength is simply the sum of the uplink and downlink fades; i.e. $\Delta S^{dB}=A_u^{dB}+A_d^{dB}$. Therefore, once $A_d$ is known, $A_u$ may be calculated; i.e. $A_u^{dB}=\Delta S^{dB}-A_d^{dB}$.

If the transmitting earth station is then commanded to increase its power by only the amount $A_u^{dB}$, the link will be optimally compensated for uplink fade, in the case of any combination of uplink and downlink rain fade, even if simultaneously non-zero, while the satellite transponder output power (i.e. downlink) will remain constant, which is the objective.

Characterization of the curve, calibration, computations, and commands to the transmitting station might take place at any or several locations, such as within the transmitting station, the receiving station, or an independent control location, provided that the appropriate control communications channels are in place. Such communications channels could include a data channel on the satellite link itself (one-way or both ways), a terrestrial network such as the Internet, a private data network, or telephone lines, or any other wired and/or wireless network.

If the earth stations also communicate in the opposite direction, both will have transmitting and receiving equipment, and the signal traveling in the reverse path will pass through the same fade conditions and the signal in the forward path. In this case both earth stations, rather than only one, may measure their own values for S and Q, and the same algorithms apply, resulting in two independent estimations of the same $A_u$ and $A_d$ (after compensation for the effects of differences in uplink and downlink frequency). Therefore, by averaging or otherwise merging the two independent estimates, accuracy and/or reliability of the estimations may be enhanced.

In practice, the above algorithms must be calibrated, both for initial clear-sky conditions, and possibly repeatedly, to accommodate slow time-varying changes in link parameters other than $A_u$ and $A_d$. Calibration involves estimation of the parameters which determine the shape and position of the curve in FIG. 3, which is given by:

$$A_d = \frac{\frac{G_A N_{TS}}{L_P} - kT_D}{\frac{N_o}{G} - k(T_A + T_R + T_D)} \quad \text{(Equation 1)}$$

Where:
 $A_d$=attenuation of downlink fade
 $N_o$=noise spectral density at the output of the receiver ("noise power")
 G=gain of the receiver
 $G_A$=antenna gain;
 $N_{TS}$=effective isotropic radiated power spectral density of the noise generated in, or relayed by, the satellite;
 $L_p$=free-space path loss from the satellite to the receiving earth station;
 $T_D$=physical temperature of the downlink fade attenuation medium
 $T_A$=noise temperature of the antenna
 $T_R$=noise temperature of the receiver
 k=Boltzmann's constant
 Equation 1 may be re-written as:

$$A_d = \frac{-a}{\frac{N_o}{G} - b}$$

Receiver gain G may be normalized by establishing $N_o$ under clear sky conditions. The parameters a and b may be calibrated by combination of one or more of the following methods:

1. Insertion of a slab of known-loss material in front of the antenna feed, emulating a known $A_d$, then measuring $N_o$;

2 Use of the receiving earth station's signal measurement capability in a defined bandwidth to measure $N_o$ in the absence of the uplinked signal, thereby isolating $N_{TS}$;

3. Use of the receiving earth station's signal measurement capability in a defined bandwidth to measure $N_o$ with the antenna 18 pointed away from the satellite, hereby isolating $T_A$ and $T_R$.

4. By measuring, at the earth station at which the downlink attenuation is calculated, noise power ($N_o$) in the absence of an incoming signal and comparing the same with noise power measured when an antenna of said earth station is pointed away from the repeater (satellite), thereby separating and determining antenna and receiver noise temperatures from noise at the repeater output.

Alternatively, $T_D$, $T_A$, $T_R$, $N_{TS}$, $G_A$, and $L_p$ may be known a priori from sources such as known atmospheric conditions, transponder operator information, manufacturer's data, and type approval data.

Such calibrations might be performed manually and/or automatically, using one or more of the above methods in combination, during installation and/or periodically.

Once the curve is initially parameterized, an algorithm can determine $A_u$ from continual measurements of S and Q. A device executing such an algorithm can then command the transmitting earth station to increase its power by the amount $A_u$. The link is then optimally compensated for uplink fade, in the case of any combination of uplink and downlink rain fade, while maintaining constant satellite transponder output power (for the downlink).

The above methods will have improved accuracy when:
 (a) The sum of the antenna noise temperature and the receiving system noise temperature is reduced below the temperature of the precipitation (typically 290° Kelvin); and
 (b) Transponder noise is small, i.e., it degrades the overall Eb/No by less than 0.5 to 1 dB.

Accuracy is also improved if the transmitting earth station has the capability to maintain a nominal transmit power with high absolute accuracy, and to adjust its power with high relative accuracy. When the absolute and/or relative power are accurately known, the continued accuracy of the calculation of the uplink attenuation is improved. An example of an accurate power detector built into a satellite transmitter is the one included in the Model 3100 Block Upconverter manufactured by Sierracom, Hopkinton, Mass.

EXAMPLE

Figure 5:
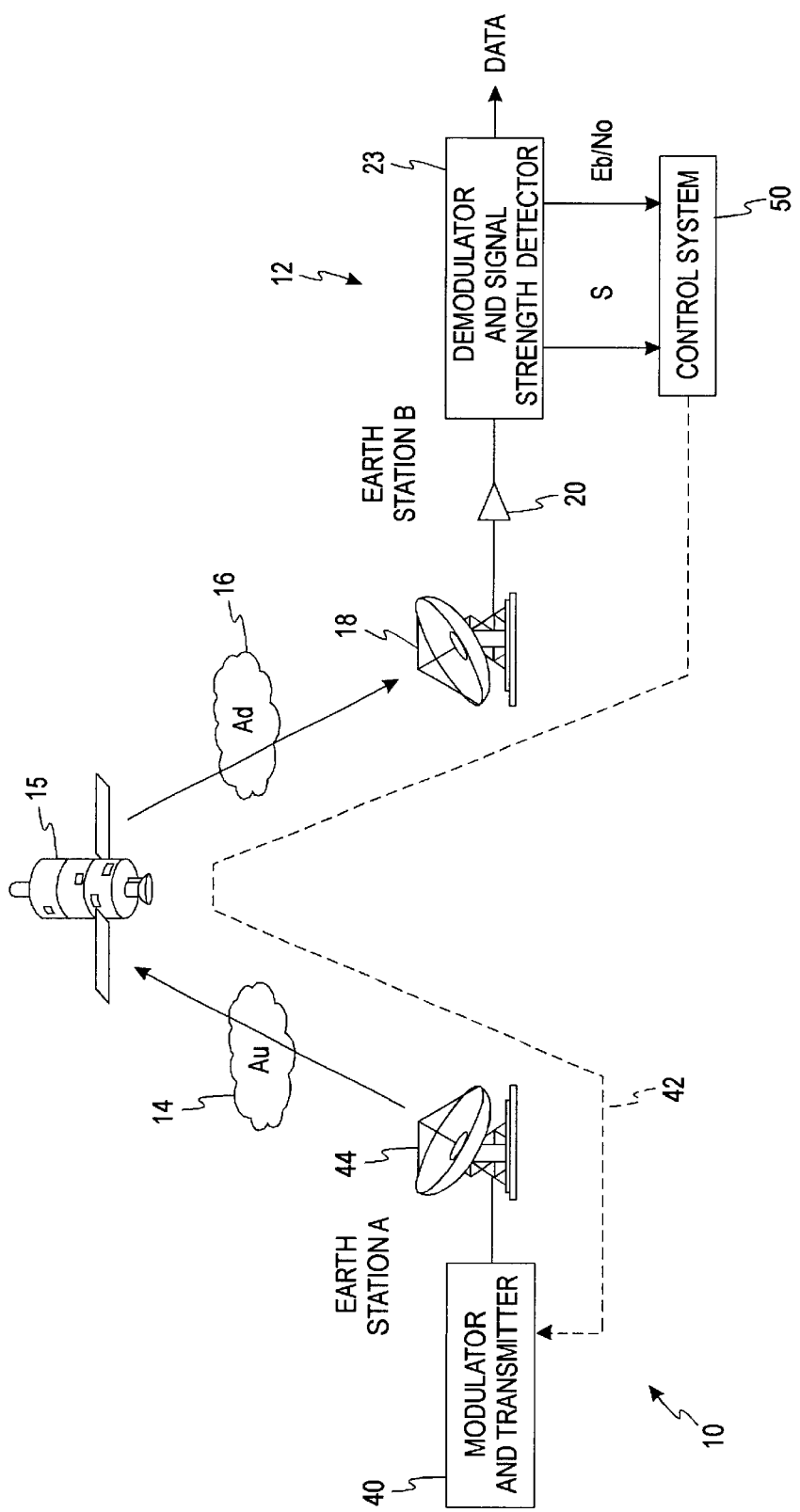
FIG. 5 is a diagram, similar to claim 1, showing communications between a pair of earth stations via a satellite in accordance with one embodiment of the invention.

Referring to FIG. 5, earth station A 10 has a modulator and transmitter 40 equipped with means for accepting commands over a service channel 42 to adjust the transmit power, and transmits a signal at a frequency of e.g. 14.2 GHz at its antenna 44. The transmitted signal is attenuated by fade conditions 14, local to earth station A, by the amount $A_u$. The satellite 15 receives the uplink signal, amplifies it, shifts its frequency to about 12 GHz (e.g., from 14.2 GHz to 11.9 GHz), and re-transmits it toward earth. The satellite 15 also adds noise of various sources, including its own receiver noise and intermodulation products from other signals in the transponder. The power of the signal at the satellite transponder output is designated $S_T$. This signal passes through fade attenuation $A_d$ (16), which is local to earth station B (12).

Earth station B receives the signal with its antenna 18, amplifies (20) and frequency-converts it, and demodulates. The demodulator 23 in earth station B is equipped with electronics having the capability to independently measure signal level S and $E_b/N_o$. Also included in earth station B is a control system 50. In response to queries from a control system 50, the demodulator 23 reports the values of S and $E_b/N_o$. The service channel 42 between earth stations A and B is implemented via the reverse satellite link. The control system 50 at earth station B may command earth station A to adjust its transmit power.

In "clear-sky" operation (i.e., $A_u^{dB}$=0, $A_d^{dB}$=0), earth station A operates at its nominal transmit power. The control system 50 may deduce that the link is in clear-sky state by statistical analysis of the $E_b/N_o$ readings; for example, a variance over the previous 30 minutes of less than 0.5 dB indicates clear sky on both sides. The control system 50 then commands earth station A to revert to its nominal power, notes the signal strength (denoted S'), notes the $E_b/N_o$ (denoted Q'), and calculates (or recalculates) a calibration constant K as follows:

$$K = S'^{dB} - Q'^{dB}$$

Earth station A has the capability to maintain a nominal transmit power with high absolute accuracy, and to adjust its power with high relative accuracy, thus improving accuracy and long-term stability.

During non-clear-sky operation, the control system 50 continually recalculates the change in power spectral density as follows:

$$\Delta N_o^{dB} = S^{dB} - Q^{dB} - K$$

where $\Delta N_o^{dB}$ is the difference between $N_o^{dB}$ at clear sky and $N_o^{dB}$ in operation, and K is the calibration constant.

Because Q is directly proportional to the signal to noise ratio, the proportionality constant K accounts for the bit rate and the absolute gain of the receive system prior to the signal level detector.

K is calibrated, using the values of S and Eb/No, provided that conditions are known to be clear-sky (as noted above), as follows:

$$K = S'^{dB} - Q'^{dB}$$

Therefore in operation, $$N_o^{dB} = S'^{dB} - Q'^{dB} - K$$

The control system also continually calculates the change in signal strength denoted $\Delta S$:

$$\Delta S^{dB} = S^{dB} - S'^{dB}$$

From $N_o$, the control system calculates the downlink attenuation $A_d$ from Equation
1. The parameters of the curve are predetermined as follows:

$T_D$=285K (13° C.), a typical upper-atmosphere temperature $T_A$=noise temperature in Kelvin of the antenna, provided by the manufacturer;

$T_R$=noise temperature of the LNA, provided by the manufacturer, $N_{TS}$=Spectral density effective isotropic radiated power of noise in the transponder output at the desired downlink frequency, provided by the satellite operator;

$G_A$=gain of the antenna, provided by the manufacturer;

$L_p$=path loss from the satellite, calculated from the operating frequency and satellite distance.

From $A_d$, the control system then estimates the uplink attenuation:

$$A_u = \Delta S - A_d$$

Finally, the control system commands earth station A to increase its power by the amount $A_u$, thereby achieving the objective.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method for compensating for atmospheric fading in a communication system wherein signals are sent from a first earth station to a second earth station via a repeater above the atmosphere, without increasing power of the signals in said repeater, the method comprising:

determining, at one or both of said earth stations, at various times, signal power of a received signal and a signal-to-noise ratio of a received signal;

calculating the change in noise power spectral density at said earth station from that under clear sky conditions, wherein the difference in noise power spectral density is calculated using the signal power and signal-to-noise ratio at one of said earth stations and a constant, K, wherein K is calculated as the difference, in dB, between the received signal strength under clear sky conditions and a signal-to-noise ratio under clear sky conditions;

calculating a downlink attenuation;

calculating an uplink attenuation present at a sending one of said earth stations; and commanding a sending one of said earth stations to increase its transmit power by an amount to compensate for the uplink attenuation.

2. The method of claim 1 wherein the downlink attenuation is calculated as a function of the change in noise power spectral density and of parameters which define a shape of said function.

3. The method of claim 2 wherein the downlink attenuation is calculated at one of said earth stations, and wherein said parameters which define the shape of said function are functions of noise power spectral density at the repeater output wavelength or frequency, distance to the repeater, physical temperature of the medium causing the downlink attenuation, and noise temperature of an antenna and a receiver of the one of said earth stations at which the downlink attenuation is calculated.

4. The method of claim 3 and further including deriving at least some of said parameters by inserting a slab of a known-loss material in front of an antenna feed of the earth station at which the downlink attenuation is calculated, emulating a known downlink attenuation.

5. The method of claim 3 and further including deriving at least some of said parameters by measuring, at the receiving earth station, noise power in the absence of an incoming signal, thereby isolating total noise power at the repeater and noise due to antenna and receiver noise temperatures.

6. The method of claim 3 and further including deriving at least some of said parameters by measuring, at the earth station at which the downlink attenuation is calculated, noise power in the absence of an incoming signal and comparing the same with noise power measured when an antenna of said earth station is pointed away from the repeater, thereby separating and determining antenna and receiver noise temperatures from noise at the repeater output.

7. The method of claim 3 and further including determining at least some of said parameters by analysis of independently-provided data quantifying the noise in the repeater output.

8. The method of claim 3 and further including determining at least some of said parameters by analysis of independently-provided data quantifying the noise temperature of the antenna and receiver.

9. The method of claim 3 wherein the determining and calculating are performed at a sending one of said earth stations.

10. The method of claim 1 wherein the determining and calculating are performed at a receiving one of said earth stations and wherein said calculating further includes calculating the change in signal strength from the signal strength under clear sky conditions.

11. The method of claim 10 wherein said commanding is performed by sending a command signal from said receiving earth station to said sending earth station via a service channel.

12. The method of claim 10 wherein the uplink attenuation is determined using the change in signal strength and the downlink attenuation.

13. The method of claim 1 wherein the received signal power and signal-to-noise ratio are determined and the difference in noise power spectral density from clear sky conditions is calculated at the receiving earth station and wherein said receiving earth station further calculates change in signal strength from the signal strength under clear sky conditions, and wherein the quantities calculated and determined at the receiving earth station are communicated to the transmitting earth station via a service channel, and wherein the transmitting earth station performs the remaining calculating, determining and commanding.

14. The method of claim 1 wherein the determining and calculating are performed at the receiving earth station and also at the sending earth station, such that the uplink attenuation is determined to be the same as a downlink attenuation measured at the sending earth station when in a receive mode, compensated by frequency response differences, whereby the accuracy of the calculation of the uplink attenuation may be improved.

15. The method of claim 1 wherein at least one of absolute power and relative power of a transmitted signal at the sending earth station is accurately known, thereby improving the continued accuracy of the calculation of the uplink attenuation.

16. The method of claim 1 wherein the difference in noise power spectral density and the constant K are calculated at a receiving one of said earth stations.

17. The method of claim 1 wherein the difference in noise power spectral density and the constant K are calculated at a transmitting one of said earth stations.

18. The system of claim 1 wherein the means for calculating difference in noise power spectral density and the constant K are located at a receiving one if the earth stations.

19. The system of claim 1 wherein the means for calculating difference in noise power spectral density and the constant K are located at a transmitting one of the earth stations.

20. A system for compensating for atmospheric fading in a communication system wherein communication signals are exchanged between first and second earth stations via a repeater above the atmosphere, without increasing power of the repeater, the system comprising:

means for determining, at one or both of the earth stations, the signal power of a received signal and a signal-to-noise ratio of the received signal;

means for calculating the difference in noise power spectral density at the receiving earth station from that under clear sky conditions, wherein the difference in noise power spectral density is calculated using the signal power and signal-to-noise ratio determined at said one of said earth stations and a constant, K, wherein K is calculated as the difference between the received signal strength under clear sky conditions and a signal-to-noise ratio under clear sky conditions;

means for calculating the downlink attenuation;

means for calculating the uplink attenuation; and means for commanding a sending one of the earth stations to increase its transmit power by an amount to compensate for the uplink attenuation.

21. The system of claim 20 wherein the downlink attenuation is calculated as a function of the difference in noise power spectral density and a parameter which defines the shape of said function.

22. The system of claim 21 wherein the downlink attenuation is calculated at one of said earth stations, and wherein said parameters which define the shape of said function are functions of noise power spectral density at the repeater output wavelength or frequency, distance to the repeater, physical temperature of the medium causing the downlink attenuation, and noise temperature of an antenna and a receiver of the one of said earth stations at which the downlink attenuation is calculated.

23. The system of claim 22 and further including a slab of a known-loss material which may be temporarily inserted in front of an antenna feed of said earth station at which the downlink attenuation is calculated, emulating a known downlink attenuation, whereby at least some of said parameters may be derived.

24. The system of claim 22 and further including means for deriving at least some of said parameters by measuring, at the receiving earth station, noise power in the absence of an incoming signal, thereby isolating total noise power at the repeater and noise due to antenna and receiver noise temperatures.

25. The system of claim 22 and further including means for deriving at least some of said parameters by measuring, at the earth station at which the downlink attenuation is calculated, noise power in the absence of an incoming signal and comparing the same with noise power measured when an antenna of said earth station is pointed away from the repeater, thereby separating and determining antenna and receiver noise temperatures from noise at the repeater output.

26. The system of claim 22 and further including means for determining at least some of said parameter by analysis of independently-provided data quantifying the noise in the repeater output.

27. The system of claim 22 and further including means for determining at least some of said parameters by analysis of independently-provided data quantifying the noise temperature of the antenna and receiver.

28. The system of claim 22 wherein the means for determining and calculating are located at a receiving one of said earth stations and wherein said means for calculating further includes means for calculating a change in signal strength from signal strength under clear sky conditions.

29. The system of claim 28 wherein said means for commanding comprise means for developing a command signal at said receiving earth station and a service channel for sending said command signal from said receiving station to said sending earth station.

30. The system of claim 28 wherein the uplink attenuation is determined using the change in signal strength and the downlink attenuation.

31. The system of claim 22 wherein the means for determining and means for calculating are located at a sending one of said earth stations.

32. The system of claim 20 wherein the means for determining the received signal power and signal-to-noise ratio and the means for calculating difference in noise power spectral density from clear sky conditions are located at the receiving earth station and wherein said receiving earth station further includes means for calculating a change in signal strength from signal strength under clear sky conditions and further including means at the receiving earth station for communicating with the sending earth station via a service channel, and wherein the remaining calculating, determining and commanding means are located at the sending earth station.

33. The system of claim 20 wherein means for determining and means for calculating are located at both a receiving one and a sending one of the earth stations such that the uplink attenuation is determined to be the same as a downlink attenuation measured at the sending earth station when in a receive mode, compensated by frequency response differences, whereby the accuracy of the calculation of the uplink attenuation may be improved.

34. The system of claim 20 and further including means for accurately determining at least one of absolute power and relative power of a transmitted signal at the sending one of said earth stations.

* * * * *